Nov. 19, 1968  E. A. WAHL  3,411,675
POWDER FEEDING APPARATUS
Filed June 23, 1966
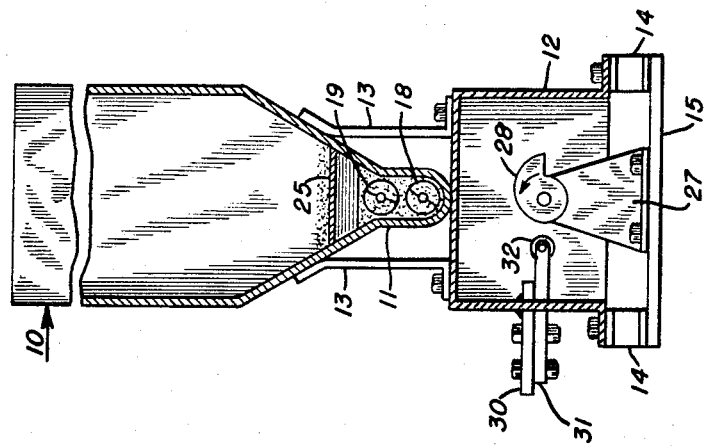
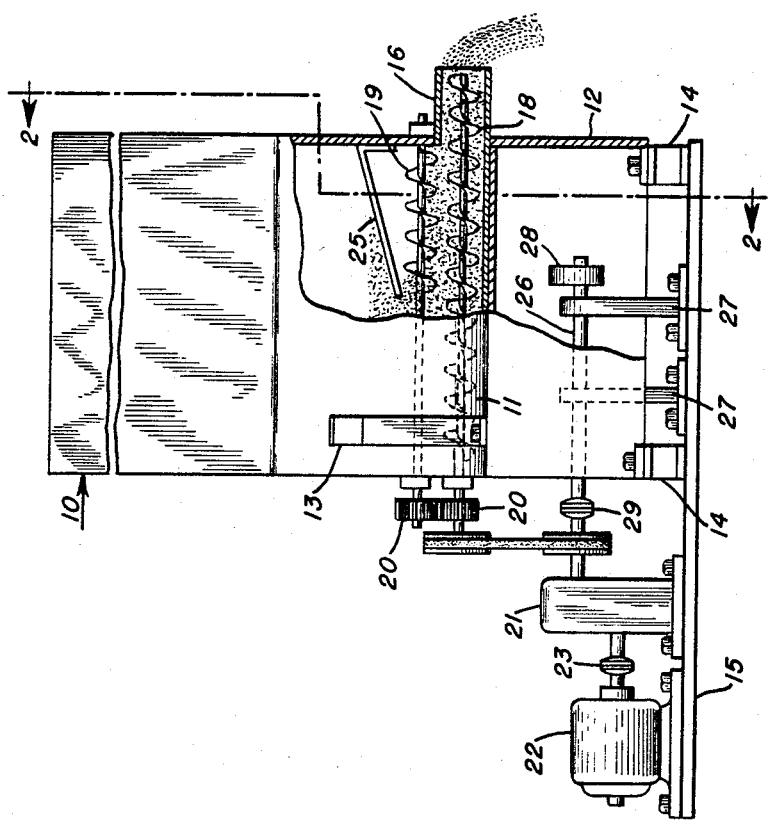
EUGENE A. WAHL
INVENTOR.
BY Rudolph J. Jurick
ATTORNEY 3,411,675
POWDER FEEDING APPARATUS
Eugene A. Wahl, 294 Forest Ave.,
Glen Ridge, N.J. 07028
Filed June 23, 1966, Ser. No. 559,813
5 Claims. (Cl. 222—238)

ABSTRACT OF THE DISCLOSURE

Apparatus for discharging particulate material at a constant rate. A pair of vertically-spaced augers are disposed at the bottom of a supply hopper and simultaneously rotatable to move the material in opposite directions. The lower auger moves the material directly from the hopper to a discharge opening and the upper auger moves excess material away from the discharge opening, thereby to maintain a constant head load on the material as it passes to the opening. A baffle member is positioned to prevent direct flow of the material from the hopper to the upper auger.

---

This invention relates to powder-feeding apparatus and more particularly to improved apparatus for continuously dispensing powdered or granular materials into a medium or container at a predetermined volumetric rate.

Powder feeders are employed to discharge measured amounts of powder, or the like, into a container or a medium such as, for example, chemicals into a stream of water for purification or other treatment. In general, volumetric feeders comprise a trough receiving material from a supply hopper and having a discharge opening at one end. A screw, or auger, rotating at a constant speed, is disposed in the trough and moves the material to the discharge end thereof. Feeder apparatus, of this class, is disclosed in my United States Patents Nos. 2,800,252, dated July 23, 1957, and 2,957,608, dated Oct. 25, 1960. In order to provide a positive discharge of the relatively sticky materials, at a constant rate, the screw and trough preferably are vibrated.

I have found that in feeders of the rotatable auger class, the material tends to compact between the flights of the auger at the discharge end thereof. The degree of such compacting is related to the mechanical parameters of the auger, tube and discharge opening, as well as the flow characteristics of the particular material. Even though such material compacting, in a given feeder and operating with a given material, may be relatively small, it effects the feed rate accuracy. Apparatus made in accordance with this invention includes a novel arrangement for controlling such material compacting, thereby improving the operating accuracy of the apparatus.

An object of this invention is the provision of a powder feeder of the rotatable auger class, which feeder has an operating accuracy exceeding that of feeders heretofore available.

An object of this invention is the provision of an improved powder feeder of the class comprising a feed auger rotatable in a chamber having a material-discharge opening, which improved feeder incorporates an auxiliary auger arranged to move material in a direction opposite to that of the primary auger at the discharge end of the trough, said auxiliary auger serving to maintain a constant head load on the material as it passes to said discharge opening, thereby increasing the operating accuracy of the feeder.

An object of this invention is the provision of a material feeder comprising a supply hopper, a pair of vertically-spaced augers arranged for movement of material in opposite directions; means forming a flow path for the downward flow of material directly from the supply hopper to the lower auger and means blocking the downward flow of material to the flights of the upper auger.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a side elevational view of apparatus made in accordance with this invention with parts broken away and parts in section; and FIGURE 2 is a cross-sectional view taken along the line 2—2 of FIGURE 1.

Referring now to the drawings, an elongated supply hopper 10, having sloping side walls which terminate in a generally U-shaped trough 11, is removably secured to a platform 12 by four brackets 13, the upper ends of the brackets being welded to the hopper. End portions of the platform are offset outwardly and rest upon four flexible rubber mounts 14, said ends being secured in place by screws passing through the mounts and threaded into holes formed in the base 15.

A discharge tube 16 is welded to the wall defining a hole formed in the front end wall of the trough and has an inside surface which is flush with the lower, circular portion of the trough. Extending the full length of the trough and into the discharge tube is a feed auger 18 having a shaft rotatable in a bearing carried by the rear end wall of the trough. An auxiliary, or leveling auger 19, is disposed above and spaced from the feed auger and has a shaft rotatable in aligned bearings carried by the front and rear walls of the trough. The two augers are coupled together for simultaneous rotation by means of the gears 20. The drive shaft of a variable gear reduction unit 21 is coupled to the feed auger 11 by means of pulleys and a belt and the input shaft of this unit is connected to the shaft of a synchronous motor 22 by means of a flexible coupling 23. The auxiliary auger 19 is provided with flights for approximately one-third of its length, which flights are disposed beneath a sloping internal baffle 25 secured to the front wall of the hopper, as by welding, which baffle extends across the full width of the hopper.

It will be apparent that the material in the hopper is free to flow directly to the flights of the feed auger 18 which are disposed between the end of the baffle and the rear wall of the trough. When the motor is energized, the feed auger rotates in a direction to move the material through the tube 16 and out of the open end thereof. The critical point at which the metering function takes place is at the entrance to the discharge tube 16, since this opening determines the volume of the material transported through the tube by the flights of the auger. Assuming the auxiliary auger and the baffle are omitted, as in the case of present feeders, the rotating auger flights normally move a greater volume of material toward the discharge tube than can be accommodated within the tube. Consequently, there is a compacting and build up of the material at the tube entrance. This effect is variable and, therefore, limits the feed rate accuracy of the apparatus. This variable effect is eliminated in a feeder constructed as herein described. The auxiliary auger 19 is arranged to move material in a direction opposite to that of the feed auger. The level of the material at the entrance of the tube 16 can only build up to a fixed level determined by the spacing between the two augers. Material above this level is moved in a reverse direction by the flights of the auxiliary auger and distributed along the flights of the feed auger. In effect, the auxiliary auger acts as a scraper to maintain the compacting of the material in the underlying flights of the feed auger at a steady state. This results in a constant density of the material being moved through the discharge tube 16, resulting in an improved feed rate accuracy.

In the case of materials having a sticky characteristic, it is desirable to vibrate the augers and the trough, thereby to promote a uniform discharge of the material. For this purpose, a shaft 26 is rotatably carried by a pair of bearing blocks 27 which are bolted to the main base 15. Such shaft, carrying a cam 28, is connected to the drive shaft of the gear reduction unit by means of a flexible coupling 29. As seen in FIGURE 2, a flat bar 30, passing through an opening formed in the side wall of the platform 12, is welded to such wall. An extended, flat bar 31 carries a cam roller 32 and is provided with a longitudinal slot. Two bolts pass through this slot and through individual holes formed in the upper bar 30. Thus, the bar 31 may be adjusted to establish a desired distance between the roller 32 and the low point of the cam surface, after which the bar is secured in such position by tightening the nuts carried by the two screws. As the cam rotates, its high portion will engage the roller, thereby displacing the platform to the left and flexing the rubber mounts 14. After the high portion of the cam leaves the roller, the platform will move to the right and continue vibrating until the cam again engages the roller.

Having now described the invention, those skilled in this art will be able to make various changes and modifications without thereby departing from the spirit and scope of the invention as recited in the following claims.

I claim:
1. Apparatus for discharging powdered or the like material comprising:
 (a) a supply hopper for the material,
 (b) a material-receiving chamber having a discharge opening at one end,
 (c) a first auger rotatable within said chamber to move material through the discharge opening,
 (d) means forming a direct passageway for the flow of material from the hopper to the flights of the first auger,
 (e) a second auger within said chamber vertically spaced from the first auger and rotatable in a direction to move material away from the said discharge opening,
 (f) means within the hopper positioned above the second auger and blocking direct flow of material from the hopper to the flights of the second auger, and
 (g) means simultaneously rotating the two augers.

2. Apparatus for discharging powdered or the like material at a constant rate comprising:
 (a) a supply hopper,
 (b) a trough disposed below the hopper to receive material therefrom and terminating in a discharge tube,
 (c) a first auger having flights extending substantially through the trough and the discharge tube,
 (d) a second auger within said trough spaced above and parallel to the first auger, said second auger having flights which extend from the entrance of the discharge tube to a point intermediate the ends of the trough,
 (e) a baffle within the hopper overlying the flights of the second auger and preventing the direct flow of material from the hopper to the flights of the second auger, and
 (f) means rotating the augers at a constant speed for movement of material in opposite directions.

3. The invention as recited in claim 2, including means for vibrating the trough and augers.

4. Apparatus for discharging powdered or the like material at a constant rate comprising:
 (a) an elongated hopper having sloping side walls terminating in a generally U-shaped trough,
 (b) a discharge tube carried by the hopper and aligned with an end of the trough,
 (c) a first auger having flights of axial length less than the length of the trough extending substantially through the trough and the discharge tube,
 (d) means rotating the first auger at a constant speed in a direction to move material from the trough through the discharge tube,
 (e) a second auger having flights,
 (f) means mounting the second auger within the trough parallel to and above the first auger with the flights of the second auger proximate to the entrance opening of the discharge tube,
 (g) means rotating the second auger in a direction to move material in a direction opposite to that of the first auger, and
 (h) a sloping baffle member secured to the hopper, said member spanning the hopper and overlying the flights of the said second auger.

5. The invention as recited in claim 4, wherein the hopper is secured to a vibratable platform and including means for vibrating the platform.

References Cited

UNITED STATES PATENTS

| 1,042,785 | 10/1912 | Goulding | 221—204 |
| 1,644,175 | 10/1927 | Church | 259—29 |
| 2,042,896 | 6/1936 | Hodler et al. | 222—238 |
| 2,633,133 | 3/1953 | Higgins | 222—238 X |
| 3,201,005 | 8/1965 | Buhr et al. | 222—413 X |
| 3,258,165 | 6/1966 | Guyer | 222—238 |

WALTER SOBIN, *Primary Examiner.*